United States Patent Office 3,578,589
Patented May 11, 1971

3,578,589
METHOD FOR TREATING COOLING WATER
Chih Ming Hwa, Arlington Heights, Ill., and Gary J. Antony, Burnsville, Minn., assignors to W. R. Grace & Co., New York, N.Y.
No Drawing. Filed Mar. 17, 1969, Ser. No. 807,964
Int. Cl. C02b 5/06
U.S. Cl. 210—58                        6 Claims

ABSTRACT OF THE DISCLOSURE

Accumulated deposits of scale, and of mud, silt, sludge and other foulants, are removed from cooling water systems; and further deposition is inhibited; by incorporating into the water flowing through such systems a mixture of a nonionic surface active agent and from 0.01 to 10 parts by weight, per part by weight of the surface active agent, of an acrylic or methacrylic acid polymer or a water soluble salt of such polymer having a weight average molecular weight of from 400 to 95,000. The mixture is added to the cooling water system in amounts up to 500 parts per million.

---

This invention relates to methods for removing existing deposits of scale and foulants in cooling systems and for inhibiting further deposition of such materials in these systems.

In summary, the method of this invention for removing existing deposits and inhibiting further deposits of scale, and mud, silt, sludge and other foulants in water-cooled industrial heat exchangers and cooling systems comprises adding to the cooling water flowing through the systems from 0.1 to 500 parts per million ("p.p.m.") of a mixture of a nonionic surface active agent and a member selected from the group consisting of acrylic acid polymers, methacrylic acid polymers, acrylic acid-methacrylic acid copolymers, and water-soluble salts of the said polymers, said polymers having a weight average molecular weight of from about 400 to 95,000 and preferably from 400 to 20,000.

Much of the water used in cooling systems and water-cooled industrial heat exchangers is supplied from rivers, lakes, ponds and the like and contain various amounts of suspended materials such as silt, clay, and organic wastes. In cooling tower systems, the cooling effect is achieved by evaporating a portion of circulating water passing through the tower. Because the evaporation takes place during cooling, the suspended materials in the water become concentrated. Furthermore, the flowing water in its passage through the tower may be fouled with solids from the air. These fouling materials settle in locations of low flow rates and cause corrosion, friction loss, and inefficient heat transfer. High molecular weight polyacrylamides and polyacrylates have been used to agglomerate fine particles of mud and silt into a loose floc, thus reducing accumulation of these materials in the pipe and heat exchanger tubes as disclosed in U.S. Pat. 3,085,916. Unfortunately these flocs tend to settle in cooling tower basins and frequent cleaning is necessary to remove the settled flocs from the tower basin.

Water used in cooling systems and water-cooled industrial heat exchangers also contain dissolved salts of calcium and magnesium which can lead to scale and sludge deposits. The most common type of water formed deposit encountered in cooling water systems is calcium carbonate. It results from the break-down of calcium bicarbonate naturally present in all raw waters. Calcium carbonate has a relatively low solubility, and this solubility decreases with increases in temperature. In addition to the temperature factor, the solubility of calcium carbonate is also determined by the pH conditions maintained in the system and the total minerals present.

Another deposit likely to be encountered in cooling systems is calcium sulfate. In many cooling water installations, it is common practice to add sulfuric acid to the raw water to control scale deposits of calcium carbonate. While the calcium sulfate which is produced by the reaction of the carbonate and sulfuric acid is much more soluble than the carbonate, it is entirely possible to exceed the solubility of calcium sulfate in the circulating cooling water and have that compound precipitated as a scale.

Calcium and magnesium phosphate sludges are also precipitated when the water-cooled industrial heat exchanger or cooling system is treated with a polyphosphate for corrosion protection.

Iron containing deposits can result either from relatively high concentrations of iron being present in the raw water supply or by active corrosion taking place in the system.

Some water supplies also contain relatively large concentrations of silica which may result in the deposition of this material along the surfaces.

It is an object of the present invention to provide an improved method for treating a water flowing in water-cooled industrial heat exchanger and cooling systems in order to reduce the amounts of adherent scale and of settled mud, silt, sludge and other foulants deposited therefrom in said systems.

Still another object of the invention is to provide an improved method for treating water flowing in water cooled industrial heat exchange and cooling water systems in order to remove previously accumulated deposits of scale, and of mud, silt, sludges and other foulants.

The method of this invention comprises adding to water flowing through water-cooled industrial heat exchangers and cooling systems from 0.1 to 500, and preferably from 0.2 to 100, p.p.m. of a mixture of a nonionic surface active agent and a water soluble acrylic or methacrylic acid polymer or water soluble salt thereof.

The polymer used in the practice of this invention can be polyacrylic acid, polymethacrylic acid, or acrylic acid-methacrylic acid copolymers, or water-soluble salts thereof, such as the respective alkali metal (e.g. sodium, potassium, or ammonium) salts. The weight average molecular weight of the polymers is from about 400 to about 95,000; and is preferably within the range of from 400 to 20,000. The preferred polymer is polymethacrylic acid or sodium polymethacrylate having a weight average molecular weight within the range of 5,000 to 15,000. These polymers are commercially available, and methods for their preparations are well known in the art.

An extremely wide variety of nonionic surface active agents may be used in the practice of the invention. Most nonionic surface active agents produced commercially today are made by treating an alcohol, a phenol, or a carboxy acid with ethylene oxide, usually in the presence of a small amount of an alkaline catalyst. A first mole of ethylene oxide adds to the hydroxy group to form a beta-hydroxyethyl ether. A second mole of ethylene oxide then adds to the hydroxyl group of this ether, and so on, and the chain of ethyleneoxy groups is thus lengthened progressively. It is easily possible to build up chains of 50 or more ethyleneoxy units, if desired, and the properties of the finished surfactant depend to a considerable extent on the average number of ethyleneoxy units present. In general, the longer the ethyleneoxy chain, the higher the solubility of the surfactant in water.

Some nonionic esters are made by the esterification of a fatty acid with a preformed polyethyleneoxy glycol, commonly called "polyethylene glycol." These glycols are made by adding ethylene oxide to ethylene glycol or to water and are in themselves heterogeneous mixtures of glycols having a range of molecular weight.

Among the best known nonionic surfactants are the condensates of ethylene oxide with alkyl phenols. A large number of different alkyl phenols may be used, including monoalkylated, dialkylated, or polyalkylated, and condensed with 6 to 20 or more moles of ethylene oxide. Typical alkyl phenols used for this purpose are diamyl phenol, p-tertiary-octylphenol, and nonylphenol.

Another class of nonionic surface active agents are the polyethyleneoxy ethers of alcohols and mercaptans. Aliphatic alcohols of more than 8 and preferably from 10 to 24 carbons atoms form polyethyleneoxy ethers which have appreciable surface activity. At least 5 moles of ethylene oxide are condensed with the hydroxy oxygen of the aliphatic alcohol. Most of the alcohols whose sulfates are commercially available have been converted to polyethyleneoxy ethers. These include not only the alcohols derived from the naturally occurring fatty acids but also various branched chan higher alcohols as disclosed in U.S. Pat. No. 2,508,035, for example.

Mercaptans add readily to ethylene oxide to form polyethyleneoxy derivatives. Higher alkyl mercaptans of the type designated by the formula RSH, where R is a straight chain alkyl group in the $C_{10}$ to $C_{18}$ range, are made from the corresponding alkyl chloride and NaSH.

Another class of nonionic surface active agents includes the difunctional and polyfunctional polyethyleneoxy ethers. These materials are prepared by treating bis-phenols with ethylene oxide. The bis-phenols can be prepared by heating a 2,4-dialkyl phenol with formaldehyde in the presence of a strong acid.

Particularly economical surface active materials are the polyethyleneoxy esters made by reacting ethylene oxide with fatty carboxylic acids, such as the polyethyleneoxy ester of tall oil acids. In reacting tall oil with ethylene oxide, the dry alkali metal soap of the acid is used as a catalyst, and the temperature of reaction is usually 150° C. or above. Condensates with polycarboxylic acids can be used, but derivatives of monocarboxylic acids are preferred.

Other nonionic surface active agents have been made from the fatty acids of oxidized paraffin wax. Still other raw materials which can be reacted with polyglycols to yield nonionic surfactants are dimerized linoleic acid and alkylated benzoic acids. Naphthenic acids have also been reacted with ethylene oxide to form strong surface active esters. Still other suitable starting materials among the carboxylic acids include the alkylcyclohexene-carboxylic acids, rosin acids, modified rosin acids, and the long chain alkyl ethers of thioglycolic acid.

An improtant class of nonionic surface active agents for the purposes of this invention are the esters produced by reacting fatty acids with polyethyleneoxylated polyols. The surfactants of this class include materials such as "Tweens" in which the polyol employed is a mixture of anhydrosorbitols. Other polyols which have been used for this type of synthesis include glycerol, polyglycerol, pentaerythritol, and the glucosides.

The higher alkyl phosphates can be reacted with ethylene oxide or with polyglycols to form mixed esters which are essentially ester-linked polyethyleneoxy nonionics in which the linkage is formed by the trifunctional inorganic acid, $H_3PO_4$. Analogus compounds have been prepared from the alkyl pyrophosphates, polyphosphates, and phosphonates. More than one alkyl group can be linked to the phosphate radical, and the alkyl groups can be derived from the straight chain fatty alcohols or from alcohols of petrochemical origin.

Fatty acid alkanolamides of the type $RCONHC_2H_4OH$ react with ethylene oxide quite readily to yield polyethyleneoxy derivatives in which the polyglycol chain is attached to hydroxyl group rather than to the amide nitrogen. Polyethyleneoxy alkanolamides of fatty acids are available commercially under the name "Ethomid." Condensates of at least 5 moles of ethylene oxide with the amide nitrogen of an aliphatic amide having from 10–24 carbons such as "Ethomid HT" can be used.

The alkylarylsulfonamides have been ethyleneoxylated to form surfactant materials. Similar products are obtained by reacting alkylbenzenesulfonyl halides or alkanesulfonyl chloride with amines and ethyleneoxylating. Other nitrogenous intermediates which form nonionic surfactants when treated with ethylene oxide are the long chain carbamates and the long chain hydroxyalkyloxazolines.

Fatty acid guanylureas have been reacted with ethylene oxide to produce water-soluble nonionic surface active agents. The fatty acid chloride is first condensed with dicyandiamide to form an acyl derivative from which the cyano group is hydrolyzed with acid, and the resulting fatty acid quanylurea is treated with ethylene oxide. Similarly, symmetric dialkylarylthioureas may be reacted with from 20 to 35 moles of ethylene oxide to produce water surface active materials.

Aromatic amines can also be used as linkages between a fatty acyl hydrophobic radical and a solubilizing polyethyleneoxy chain. Compounds of this nature which have been described in the literature include:

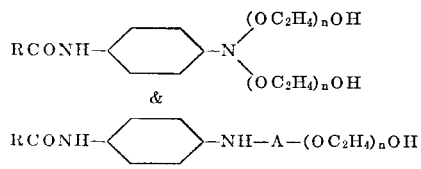

&

$$RCONH-\left\langle\phantom{x}\right\rangle-NH-A-(OC_2H_4)_nOH$$

where A is the radical of a polyol such as glycerol or a sugar alcohol.

Not all nonionic surfactants have polyethyleneoxy chains in their structure. The best known members of this class are the esters of the sugar alcohols, sorbitol and mannitol. These materials are mixtures of esters in which the sorbitol portion of the molecule is partly esterified and partly dehydrated before esterification to form the cyclic inner ethers monoanhydrosorbitol and dianhydrosorbitol.

Fatty acid esters of the di- or polysaccharides, such as sucrose or dextrine are also suitable materials. Gluconamides prepared by condensing a primary amine in the surface active range with delta-gluconolactone can also be employed.

Many different types of nonionic surfactants have been based upon glucose because of its relatively low cost. Hydroxypropylglucoside can be prepared from propylene glycol and glucose and then esterified with fatty acids, and further reacted by condensation with ethylene oxide. When glucose is condensed with ethylene chlorohydrin in the presence of acid catalysts, beta-chloroethylglucoside is produced. Two moles of this hydrophilic halide can be reacted with one mole of ammonia to form the bis-glucoside of diethanolamine. When the amino group of this material is acylated with lauric acid, a water soluble surfactant is produced.

Glucose can also be converted to a glucamine or N-alkylated glucamine. The glucamines can be prepared by the hydrogenation of a mixture of glucose with ammonia or a lower primary amine.

The fatty acyl derivatives of alkanol amines are surface active and water soluble, provided that there is a sufficient number of hydroxyl and/or ether groups in the alkanol amine from which they are made. For example, glycerylamines of good solubility can be produced by reacting ammonia with the cyclic ketal formed from monochlorohydrin or epichlorohydrin and acetone, and hydrolyzing the resulting amine to hydrolyze the acetal linkages.

Of all the nonionic surfactants available for use in the practice of this invention we particularly prefer to employ condensates of ethylene glycol, propylene glycol, or mixtures of ethylene oxide and propylene oxide or derivatives of these condensates, namely the esters, ethers, amines, amides, thioethers, or thioesters. Within this subclass, the most especially preferred compounds are:

(a) Nonylphenoxypolyethyleneoxy ethanol (9 to 10 ethylene oxide groups);
(b) Polyethyleneoxy glycol (weight average molecular weight about 400) mono-laurate ester;
(c) Polyethyleneoxy glycol (weight average molecular weight about 400) di-oleate ester;
(d) Polyethyleneoxylated stearyl alcohol (average of 20 ethylene oxide groups);
(e) A block polymer of propylene oxide and ethylene oxide with a molecular weight of approximately 8750. 80% of the molecule, by weight, consists of polyethyleneoxy groups.

The proportions of ingredients in the mixtures used in the practice of this invention will vary in accordance with the circumstances involved. In general, the mixtures will include from 0.01 to 10 parts by weight of the water soluble polyacrylic acid, polymethacrylic acid or acrylic acid-methacrylic acid copolymer or salt thereof, per part by weight of the nonionic surface active agent. Preferably the mixture will include 0.02 to 2 parts by weight of polymer or polymer salt per part by weight of the surface active agent.

The mixture, in the proportions stated above, will provide beneficial results when added to the cooling water to be treated in dosages of at least about 0.1 p.p.m. up to as high as about 500 p.p.m. Preferably dosages will range between about 0.2 and 100 p.p.m.

The compositions used in the practice of the present invention may also include other ingredients customarily employed in water-cooled industrial heat exchanger and cooling water treatments. For example, biocides may be added to the composition in suitable dosages to aid in controlling algae, bacteria and fungi often encountered in cooling tower operations.

The point in the systems at which the treatment mixtures are added is not critical. For example, the mixtures can be added to the makeup or fresh water line from which water enters the systems, or to recirculating water lines, sumps or reservoirs in the system. In addition, it will be obvious that the treating agents may be added separately, if desired, so long as the resultant proportions are within the above defined ranges.

The invention is further illustrated by the following specific but non-limiting examples.

EXAMPLE 1

This sample demonstrates the synergistic cooperative action of the nonionic surface active agent and the water soluble polymer in the practice of this invention.

In the test, cooling water having the following composition was used.

| | Concentration, p.p.m. |
|---|---|
| Calcium sulfate | 1136 |
| Magnesium sulfate | 252 |
| Sodium bicarbonate | 185 |
| Calcium chloride | 784 |
| Kaolin | 150 |
| Silica | 30 |
| Ferric oxide | 20 |
| Sodium polyphosphate (as $PO_4$) | 75 |

During the tests, the makeup water was fed to a closed recirculating test system at a rate of 5 gallons per day, the overflow from the test system being discharged to waste. In the closed circulating system, circulating water having a temperature of 130° Fahrenheit and a pH of 7.5–8.0 was passed at a rate of one gallon per minute through an arsenical admiralty brass tube for the scaling test. The brass tube was surrounded by a jacket through which a heating fluid having an initial temperature of 240° Fahrenheit flowed countercurrently. The circulating water was then cooled to 130° Fahrenheit and recirculated through the system. The total circulating time for each test was 10 days. At the end of each test, the admiralty brass tube was removed; scale from representative areas of the tube interior was removed and weighed to determine a weight gain per unit area due to scaling. In Run 1, untreated water was tested. In Run 2, the circulating water was treated with 10 p.p.m. of nonylphenoxypolyethyleneoxyethanol having 9 ethyleneoxy groups (Atlas Chemical's "Renex 698"). In Run 3, the circulating water was treated with 0.6 p.p.m. of sodium polymethacrylate having a weight average molecular weight of about 9,000, calculated as the free acid. In Run 4, the circulating water was treated with a combination of the materials and dosages used in Runs 2 and 3. Results are shown below:

| Run number: | Scaling rate [1] |
|---|---|
| 1 | 106.9 |
| 2 | 70.7 |
| 3 | 70.3 |
| 4 | 51.1 |

[1] Milligrams per square decimeter—day.

EXAMPLES 2–4

These example illustrate liquid compositions useful, in suitable dosages, for the treatment of water-cooled industrial heat exchange and cooling water systems in accordance with the present invention.

EXAMPLE 2

| | Percent by weight |
|---|---|
| Nonylphenoxypolyethyleneoxyethanol (10 ethyleneoxy groups) | 10 |
| Potassium polyacrylate (weight average molecular weight 50,000, calculated as the free acid) | 1 |
| Water | 89 |

EXAMPLE 3

| | Percent by weight |
|---|---|
| Polyethyleneoxy glycol (weight average molecular weight 400) mono-laurate ester | 4 |
| Sodium polymethacrylate (weight average molecular weight 20,000, calculated as the free acid) | 15 |
| Water | 81 |

EXAMPLE 4

| | Percent by weight |
|---|---|
| Polyethyleneoxylated stearyl alcohol (average of 20 ethyleneoxy groups) | 7 |
| Polyacrylic acid (weight average molecular weight 50,000) | 3 |
| Water | 90 |

EXAMPLES 5–8

These examples illustrate solid composition useful, in suitable dosages, for the treatment of water-cooled industrial heat exchange and cooling water systems in accordance with the invention:

EXAMPLE 5

| | Percent by weight |
|---|---|
| Pluronic F68 (a block polymer of propylene oxide and ethylene oxide with a weight average molecular weight of approximately 8750. 80% of the molecule, by weight, consists of polyethyleneoxy groups. Commercial product of Wyandotte Chemicals Corporation) | 80 |
| Sodium polyacrylate (weight average molecular weight 400,000, calculated as the free acid) | 20 |

EXAMPLE 6

| | Percent by weight |
|---|---|
| Polyethyleneoxy glycol (weight average molecular weight 400) mono-stearate ester | 90 |
| Potassium polymethacrylate (weight average molecular weight 95,000, calculated as the free acid) | 10 |

EXAMPLE 7

| | Percent by weight |
|---|---|
| Polyethyleneoxy glycol (weight average molecular weight 600) di-stearate ester | 95 |
| Sodium salt of acrylic acid-methacrylic acid copolymer (1:1 molar ratio, weight average molecular weight 70,000, calculated as the free acid) | 5 |

EXAMPLE 8

| | Percent by weight |
|---|---|
| Polyethyleneoxylated stearyl amine (average of 50 ethyleneoxy groups) | 50 |
| Sodium polyacrylate (weight average molecular weight 50,000, calculated as the free acid) | 50 |

Obviously, many modifications and variations of the invention as hereinabove set forth can be made without departing from the essence and scope thereof, and only such limitations should be applied as are indicated in the appended claims.

What is claimed is:

1. Method for inhibiting deposition of scale, and of mud, silt, sludge and other foulants, in water cooled industrial heat exchange and cooling water systems which comprises adding to the cooling water flowing through said systems:
   (a) a nonionic surface active agent selected from the group consisting of polyethyleneoxy alkyl phenol, polyethyleneoxy fatty alcohols, polyethyleneoxy fatty acids and polyethyleneoxy fatty amines, and
   (b) for each part by weight of said surface active agent, from 0.01 to 10 parts by weight of a water soluble polymer having a weight average molecular weight of at least 400 and selected from the group consisting of polyacrylic acid, polymethacrylic acid, acrylic acid-methacrylic acid copolymers, or water soluble salts of said polymers in amount sufficient to provide in the said flowing water a combined dosage of from 0.1 to 500 parts per million of said surface active agent and said polymer.

2. Method of claim 1, wherein the combined dosage is from 0.2 to 100 parts per million;

3. Method of claim 1, wherein the polymer is present in proportions of 0.02 to 2 parts by weight per part by weight of the surface active agent;

4. Method of claim 1, wherein said surface active agent is a polyethyleneoxylated alkyl phenol;

5. Method of claim 4, wherein the polymer is polymethacrylic acid or a water soluble salt thereof, having a weight average molecular weight of from 400 to 20,000, calculated as the free acid.

6. Method of claim 5, wherein the polymer is sodium polymethacrylate, having a weight average molecular weight of from 5,000 to 15,000, calculated as the free acid.

References Cited

UNITED STATES PATENTS

| | | | |
|---|---|---|---|
| 2,727,867 | 12/1955 | Denman | 210—58 X |
| 2,783,200 | 2/1957 | Crum et al. | 210—56 X |
| 2,994,480 | 8/1961 | Carter | 210—58 X |
| 3,085,916 | 4/1963 | Zimmie et al. | 134—22 |
| 3,331,773 | 7/1967 | Gunderson et al. | 210—58 |
| 3,463,730 | 8/1969 | Booth et al. | 210—58 |

OTHER REFERENCES

Schwartz, A. M., et al. Surface Active Agents, 1949, pp. 202–213, Interscience Publishers, Inc., New York.

Betz Handbook of Industrial Water Conditions, fifth ed., 1957, Betz Laboratories, Inc., Philadelphia, Pa., pp. 90–99 and 148–151.

MICHAEL ROGERS, Primary Examiner

U.S. Cl. X.R.

21—2.7; 134—22; 252—82; 252—180